United States Patent
Reed et al.

(10) Patent No.: US 6,910,214 B1
(45) Date of Patent: Jun. 21, 2005

(54) METHOD, SYSTEM, AND PROGRAM FOR CONVERTING AN INPUT PARAMETER LIST INTO AN OUTPUT PARAMETER LIST

(75) Inventors: David Charles Reed, Tucson, AZ (US); John Glenn Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/382,621

(22) Filed: Aug. 25, 1999

(51) Int. Cl.[7] .............................................. G06F 3/00
(52) U.S. Cl. ...................... 719/310; 711/114; 711/161
(58) Field of Search .................. 719/310; 711/114, 711/161; 707/7

(56) References Cited

U.S. PATENT DOCUMENTS

| | | |
|---|---|---|
| 4,630,030 A | 12/1986 | Roy |
| 5,018,060 A | 5/1991 | Gelb et al. |
| 5,021,946 A | 6/1991 | Korty |
| 5,579,516 A | 11/1996 | Van Maren et al. |
| 5,835,954 A | 11/1998 | Duyanovich et al. |
| 6,078,932 A * | 6/2000 | Haye et al. ................. 707/204 |
| 6,105,076 A * | 8/2000 | Beardsley et al. ............. 710/5 |
| 6,170,023 B1 | 1/2001 | Beardsley et al. |
| 6,205,446 B1 * | 3/2001 | Mittal et al. ................. 707/101 |
| 6,209,070 B1 | 3/2001 | Reed et al. |
| 6,212,531 B1 * | 4/2001 | Blea et al. ................... 707/204 |
| 6,360,213 B1 * | 3/2002 | Wagstaff et al. ............... 707/1 |
| 6,438,543 B1 * | 8/2002 | Kazi et al. ..................... 707/5 |
| 6,601,128 B1 | 7/2003 | Burton et al. |

OTHER PUBLICATIONS

Purtilo and Atlee, "Improving Module Reuse by Interface Adaptation," 1990.*
IBM Corp., IBM 3990 Storage Control Reference (Models 1, 2, and 3), IBM Document No. GA32–0099–06, 1988.
IBM Corp., "Enterprise Systems Architecture/390: ESCON I/O Interface," IBM Document No. SA22–7202–02, 1990 [online] [Retrieved on Sep .5, 2003]. Retrieved from the internet at: http://publibz.boulder.ibm.com/cgi–bin/bookmgr_OS390/BOOKS/DZ9AR202/CCONTENTS?SHELF=DA3413A8&DN=SA22–7202–02&DT=1992090813–3030.
IBM Corp., "Implementing Snapshot," IBM Document No. SG24–2241, 1997 [online][Retrieved on Sep. 5, 2003]. Retrieved from the internet at:http://publib–b.boulder.ibm.com/Redbooks.nsf/9445fa5b416f6e32852569ae006bb65f/78a72f9f0c76bfe1852567680066ca057?OpenDocument&Highlight=0,DB2.
IBM Corp., "Using RVA and SnapShot for Business Intelligence Applications with OS/390 and DB2," IBM Document No. SG24–5333–00, 1998 [online][Retrieved on Sep. 5, 2003]. Retrieved from the internet at: http://publib–b.boulder.ibm.com/Redbooks.nsf/9445fa5b416f6e32852569ae006bb65f/d54767dd6854b458525664e00442a91?Open Document.
U.S. Appl. No. 09/347,344, filed Jul. 2, 1999, entitled "Method, System, and Program for Maintaining Electronic Data as of a Point–in–Time", by inventors W.F. Micka, Y. Novick, and D.M. Shackelford.

* cited by examiner

*Primary Examiner*—Meng-Al T. An
*Assistant Examiner*—Li Zhen
(74) *Attorney, Agent, or Firm*—David W. Victor; Konrad Raynes & Victor LLP (57) ABSTRACT

Disclosed is a method, system, and program for building a list of parameters to include with a command, such as a copy command. A plurality of input parameters is received and a determination is made as to whether a number of the input parameters exceeds a threshold number of parameters that are capable of being included in the command. The content of multiple input parameters is merged into at least one output parameter if the number of input parameters exceeds the threshold number, such that the content of the input parameters is included in a number of output parameters that does not exceed the threshold. The output parameters are then included with the command.

32 Claims, 8 Drawing Sheets

METHOD, SYSTEM, AND PROGRAM FOR CONVERTING AN INPUT PARAMETER LIST INTO AN OUTPUT PARAMETER LIST

BACKGROUND OF THE INVENTION

1. Field of the Invention

A method, system, and program for converting a list of input parameters for a command to a list of output parameters that include a different number of parameters than the input list.

2. Description of the Related Art

Data storage systems often include a feature to allow users to make a copy of data at a particular point-in-time. A point-in-time copy is a copy of the data consistent as of a particular point-in-time, and would not include updates to the data that occur after the point-in-time. Point-in-time copies are created for data duplication, disaster recovery/business continuance, year 2000 testing, and decision support/data mining and data warehousing, application development and testing.

One data duplication technique for such storage controller systems that manage access to massive storage devices is the International Business Machines Corporation (IBM) SNAPSHOT program. SnapShot is intended for use with the IBM RAMAC Virtual Array or ICEBERG disk storage systems. Such systems provide a virtual disk architecture, also referred to as Log Structured Array (LSA) system, in which mappings provide virtual locations of the data. LSA tables map host tracks to disk array storage locations where the data is stored. When data is written to the system, it is compressed and compacted, assembled into fixed blocks, and written to the DASD. All write operations in virtual disk architecture are always directed to a new place in the disk array. SnapShot operates by copying the LSA pointers to the data, and not copying the actual data. Thus, after a SnapShot copy is made, there are two sets of pointers to the same data. Further details of the SnapShot operation are described in the IBM publications "Implementing Snapshot," IBM document no. SG24-2241 (IBM Copyright, November 1997); "Using RVA and SnapShot for Business Intelligence Applications with OS/390 and DB2," IBM document no. SG24-5333-00 (IBM Copyright, August 1998), which publications are incorporated herein by reference in their entirety.

**ESA/390 is a trademark of IBM and RAMAC is a registered trademark of IBM; Iceberg is a registered trademark of Storage Technology Corporation.

When copying the LSA pointers as part of a SnapShot operation, the storage controller must take into account any control data maintained in tracks that are subject to a copy operation. One such control data set that must be accounted for is the Volume Table of Contents (VTOC). The VTOC is a data set that resides on a DASD volume and describes the contents of that volume. The VTOC is comprised of data set control blocks (DSCBs) that describe the type and/or location of data sets on that volume of contiguous areas of unassigned space. The VTOC may reside at different locations on a DASD volume. Each volume in the DASD has a unique VTOC The commonly assigned and related patent application, entitled "System for Multiple Data Transfer Operations," to David C. Reed and John G. Thompson, having Ser. No. 09/045,138 now U.S. Pat. No. 6,209,070 and filed on Mar. 20, 1998, which application is incorporated herein by reference in its entirety, describes a copy method in an LSA environment for handling VTOC tracks included in the range of tracks to Snapshot copy. This method comprises first copying control data, such as the VTOC, from a source to target functional volumes in the LSA virtual space and then, after completing the first operation, copying the pointers to the data to the target storage locations.

Although, SnapShot has proved to be an advantageous program for point-in-time copies, SnapShot only operates on a virtual disk architecture, such as an LSA architecture, where tables of pointers to the data are maintained and available for duplication.

There is thus a need in the art to provide improved point-in-time copy methods to systems that do not have an LSA type virtual array, such as home area systems, as well as LSA type data systems that utilize virtual arrays.

SUMMARY OF THE PREFERRED EMBODIMENTS

To overcome the limitations in the prior art described above, preferred embodiments disclose a method, system, and program for building a list of parameters to include with a command. A plurality of input parameters is received and a determination is made as to whether a number of the input parameters exceeds a threshold number of parameters that are capable of being included in the command. The content of multiple input parameters is merged into at least one output parameter if the number of input parameters exceeds the threshold number, such that the content of the input parameters is included in a number of output parameters that does not exceed the threshold. The output parameters are then included with the command.

In further embodiments, each input parameter comprises at least one extent that defines a range of tracks between a beginning track and end track. The beginning track of a given extent follows the tracks in all previous extents. Further, each output parameter includes at least one input extent and at least one output parameter includes the tracks from multiple input extents if the number of input extents exceeds the threshold number.

In still further embodiments, a determination is made as to whether control data is stored in tracks between the tracks of the input extents. If so, the tracks in the input extents are arranged into the output extents in a manner that avoids including any control data tracks in the tracks defined in the output extents.

In yet further embodiments, the command is a copy command to copy the track ranges defined in the output extents included as parameters to target tracks. The target tracks are capable of storing a duplicate copy of the data in the track ranges defined in the output extents. Moreover, the copy command may comprise a point-in-time copy command that indicates in data structures that the tracks in the output extents included as parameters are subject to a point-in-time copy relationship.

With preferred embodiments, if a command only accepts a limited number of parameters or extents, then the preferred logic will transform the tracks included with input extents into a number of output extents that conforms to the command parameter limitations. In this way, a user may define input extents defining ranges of tracks to specifically include user data and exclude control data, such as the VTOC or other indexes. A situation may arise where the user wants to subject the defined extents for a volume to a copy command, such as a point-in-time copy command. If the user defined extents to subject to the copy command exceed the maximum number of allowed extents for the command, then the preferred logic will rearrange how the tracks are arranged in the input extents to produce a number of output extents including tracks from all the input extents the user wanted to copy that complies with the limitations of the command.

The preferred logic may combine tracks from multiple extents in a manner that does not include the control data tracks in the output extents. In this way, the preferred embodiments may rearrange the user input extents into a fewer number of output extents to comply with command limitations on the number of extents that may be provided as command parameters and at the same time avoid including in the output extents tracks such as control data tracks that the user specifically excluded from the extents to copy.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
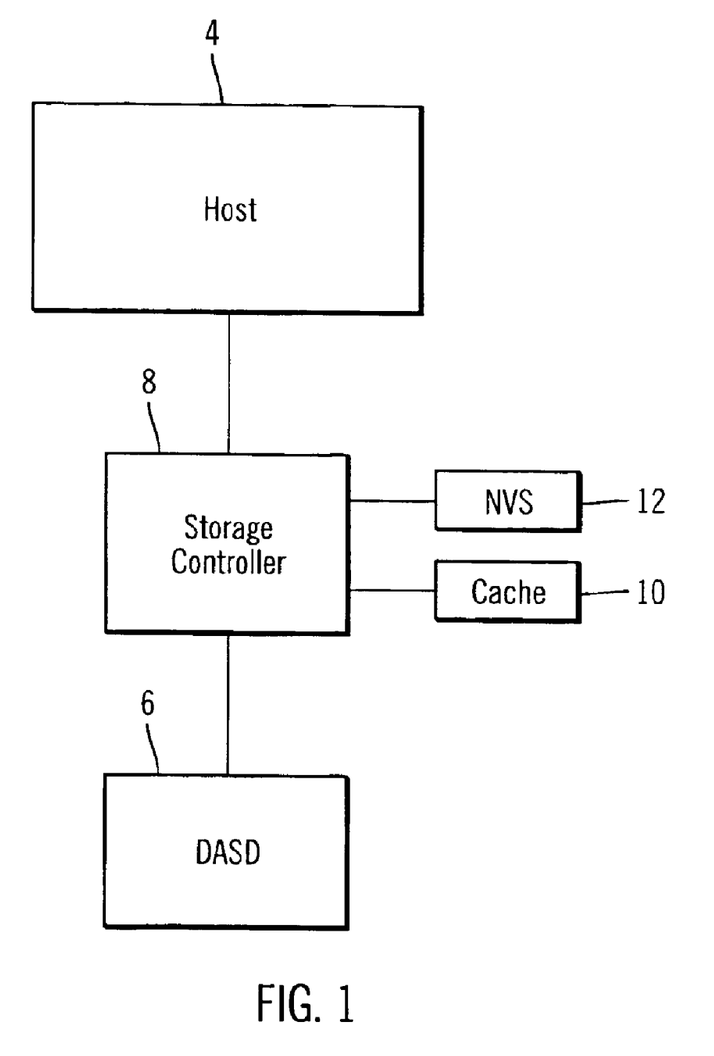
FIG. 1 is a block diagram illustrating a computing environment in which preferred embodiments of the present invention are implemented.

FIG. 1 illustrates a computing environment in which preferred embodiments are implemented. A host computer 4 performs data operations with respect to a DASD 6 via a storage controller 8 which manages access to the DASD 6. The storage controller 8 includes a cache 10. The storage controller 8 stages data from the DASD 6 into corresponding locations in the cache 10 that the host 4 requests. Similarly, data updates to tracks in the DASD 6 are stored in corresponding locations in the cache 10 until the data is destaged from cache 10 to DASD 6. The storage controller 8 may also copy any data updates written to cache 10 to a non-volatile storage unit (NVS) 12 to maintain for data recovery purposes. The NVS 12 is typically comprised of a battery backed-up volatile memory that can store the data updates for several hours in the event of a system failure.

The storage controller 8 may be comprised of the IBM 3990 Storage Controller, described in IBM publication, "IBM 3990 Storage Control Reference (Models 1, 2, and 3), IBM document no. GA32-0099-06 (Copyright IBM Corp. 1988, 1994), which publication is incorporated herein by reference in its entirety or the storage controller and host architecture described in the commonly assigned patent application "Method And System For Dynamically Assigning Addresses To An Input/Output Device," by Brent C. Beardsley, Allan S. Merritt, Michael A. Paulsen, and Harry M. Yudenfriend, filed on Oct. 7, 1998, and having U.S. patent Ser. No. 09/167,782; and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. patent Ser. No. 09/168,017, now U.S. Pat. No. 6,170,023, which patent applications are incorporated herein by reference in their entirety.

The host 4 may be comprised of any type of computing device, such as a mainframe computer, that includes a computing architecture capable of communicating input/output (I/O) commands to the storage controller 8, such as the IBM ESA/390** System described in the IBM publication: "Enterprise Systems Architecture/390: ESCON I/O Interface," IBM document no. SA22-7202-02 (Copyright IBM Corp., 1990, 1991, 1992).

**ESA/390 is a trademark of IBM and RAMAC is a registered trademark of IBM; Iceberg is a registered trademark of Storage Technology Corporation.

The DASD 6 may store data in a Count-Key-Data (CKD) format or fixed block format, such as the SCSI format. In the CKD format, each track includes one or more data records that are each prefaced with CKD information. The CKD information provides the name and format of a record, the key length, and the data length. The key field, which is optional and unrelated to the index key used to provide logical ordering to the application program 8 records, is used for searching and may include the last data set in the record. The data field provides a variable length record of user data sets. The number of CKD records that can be placed on a track depends on the length of the data areas of the records. Physical locations on the DASD 6 are identified according to cylinder, track, and the record on the track, i.e., CCHHR, where CC indicates the cylinder, HH indicates the track, and R indicates the record on the track. With the CKD format, the storage controller addresses records in the DASD 6 using the CCHHR location identifier. Alternatively, the DASD 6 may store data in addressable fixed blocks of data. In yet further embodiments, the DASD 6 may store data in any addressable storage unit known in the art, including CKD and FBA.

Preferred embodiments may be implemented using either the CKD and/or FBA architecture in systems that update data in place. This means that any updates to data in the DASD 6 are written directly to the same position on the physical space of the DASD 6 where the data to update resides. Alternatively, in embodiments utilizing the FBA architecture in a LSA system, data is stored in a compressed format on the DASD 6 and updates to data are written at the end of the file or last data track. The original data that was the subject of the update is then invalidated. In a virtual array architecture such as LSA, the DASD 6 appears to the host 4 as an IBM 3990 type system with volumes of data defined according to CCHH locations. These volumes that appear to the host 4 are referred to as functional devices. The storage controller 8 maintains tables to map the functional devices or volumes the host 4 views to physical location in the DASD 6. If data is updated, then that new updated data is stored at a new location in the DASD 6, and the storage controller 8 updates the tables to have the functional device point to the new location storing the updated data. In this way, the host 4 always references the data according to a CCHH location that remains unchanged. The storage controller 8 maintains tables to map the host 4 view to actual fixed blocks on the DASD 6.

Data Structures for Logical Point-in-Time Copying

In preferred embodiments, the storage controller 8 may be capable of performing logical point-in-time copying and erase operations. To perform these operations, the storage controller 8 builds various data structures when the host initiates a point-in-time copy operation and erase operation.

The host 4 may generate a command to make a point-in-time copy of certain tracks or data sets as of a particular moment. A point-in-time copy operation involves copying data from source tracks or areas to target tracks or areas. The source and target locations may be in the same or different logical volumes, or on the same or different physical storage devices, i.e., DASDs.

The host system 4 initiates a point-in-time copy operation on an extent, i.e., consecutive range of tracks, to preserve a copy of the data in the extent as of a particular time by specifying the source of the extent of tracks subject to the point-in-time copy and the target tracks which will maintain a copy of the source tracks. The source tracks are referred to as the protected tracks. In response to this command, the storage controller 8 generates source and target bit map data structures having bit map values that correspond to the tracks at the respective source and target physical locations in DASD 6. A bit map value of "on" or binary one indicates that the protected tracks at the point-in-time reside at the source physical location in DASD 6.

Figure 2:
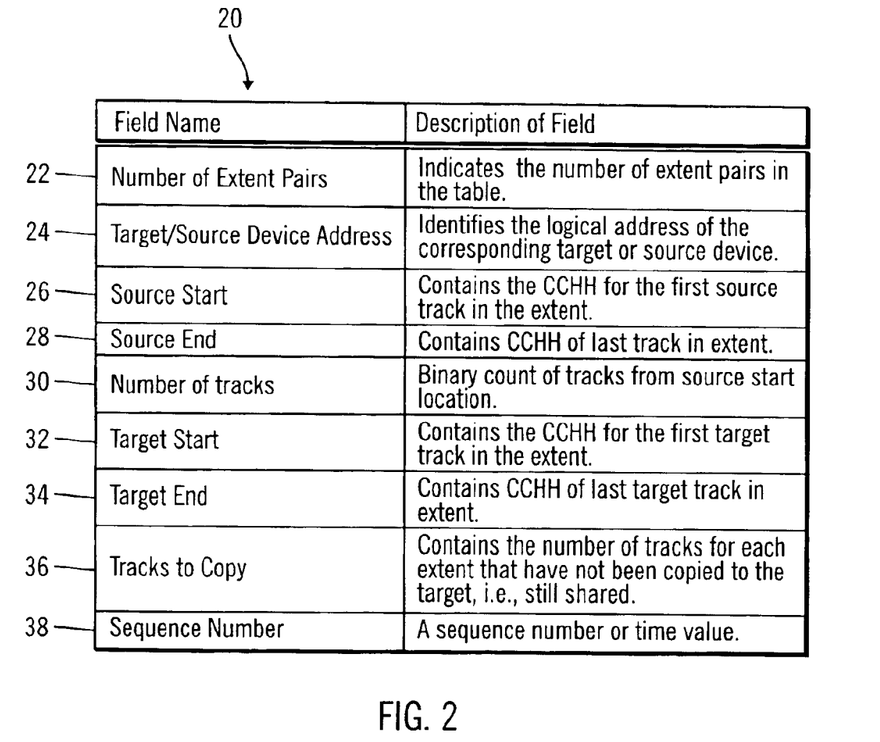
FIG. 2 illustrates a relationship table in accordance with preferred embodiments of the present invention.

The storage controller 8 further generates a relationship table for each bit map that provides a mapping of the locations in the bit map to the source and target locations in DASD 6 of the data subject to the point-in-time copy. FIG. 2 illustrates the fields in both the source and target relationship tables. The relationship table is used in conjunction with the bit map to determine the status of protected tracks, the source location of the protected tracks the bit map represents, and the location of the target for the protected tracks. An extent number field 22 indicates the number of extent pairs in the table. An extent pair comprises each group of continuous protected tracks maintained at the source location having corresponding tracks at the target location, i.e., a source/target pair. Within a range of tracks subjected to a point-in-time copy operation, there may be multiple extents of consecutive tracks at different source locations. A copy operation may involve multiple extent pairs if the source tracks for target tracks are located on different devices or logical volumes. The relationship table 20 maintains information in fields 24–34 for each extent pair indicated by the extent number 22. The device address 24 indicates the logical address of the physical storage for the corresponding target or source tracks. The source start 26 has the CCHH, FBA or location of the first source track in the extent and the source end 28 has the last protected track. The number of tracks 30 indicates the number of contiguous protected tracks to be copied from the source to the target for that extent. Each bit map value corresponds to one of the source/target track pairs subject to the point-in-time copy relationship. The tracks to copy field 36 indicates the number of tracks for each extent that have not been copied to the target, i.e., are still at the source. The sequence number 38 is a time value indicating a time or sequence when the information for an extent pair, i.e., a set of fields 22–36, was generated into the relationship table with respect to previous extent pairs in the relationship table.

Figure 3:
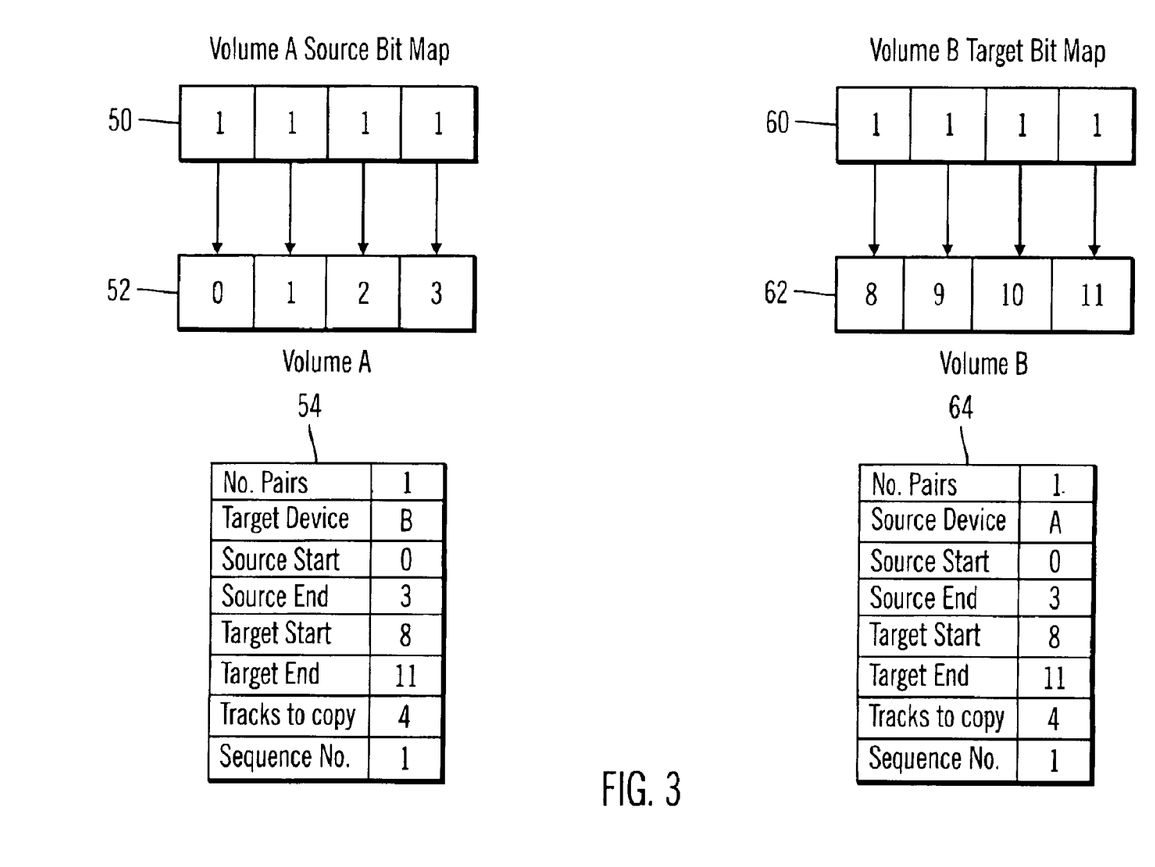
FIG. 3 illustrates block diagrams of data structures in accordance with preferred embodiments of the present invention.

The purpose of both the bit map data structures and relationship tables are to allow an instant copy of source data to be made, without having to perform actual data copy operations that can consume system resources and interfere with host 4 access to the data. FIG. 3 illustrates the result of a point-in-time copy operation in accordance with the preferred embodiments. In the example of FIG. 3, a point-in-time copy request from source tracks 0, 1, 2, and 3 in Volume A are made to target tracks 8, 9, 10, and 11 in Volume B. In response the storage controller 8 creates a source 50 and target 60 bit maps having bit map values corresponding to each of the tracks on the source 52 and target 62 devices, respectively. A one or "on" value indicates that the point-in-time copy is on the source track and a zero indicates that the point-in-time copy has been copied from the source track location to the target. The storage controller 8 would further generate source 54 and target 64 relationship tables. The source relationship table 54 for the source tracks 52 indicates that the target of the point-in-time copy is target device B, and the track ranges for the source and target. The target relationship table 64 includes the same information, except that the target table 64 indicates the source device. These relationship tables 54, 64 provide information on the protected tracks for the source and target locations.

If data is to be updated at the source tracks, then the original data in the source tracks would be copied to the target tracks. After data is copied from the source to target tracks, the bit map values in bit maps 50 and 60 corresponding to the tracks where data was copied from the source to target are set to zero. Further, the tracks to copy field in the relationship tables 54 and 64 is decremented by the number of source to target tracks copied. The commonly assigned and co-pending patent application entitled "Method, System, And Program For Maintaining Electronic Data as of a Point-in-Time," to William K. Micka, David M. Shackelford, and Yoram Novik, having U.S. Ser. No. 09/347,344, now U.S. Pat. No. 6,611,901 and filed on Jul. 2, 1999, which application is incorporated herein by reference in its entirety, describes further detail of the point-in-time copy operation.

With the data structures described with respect to FIG. 3, the storage controller 8 may perform a logical copy operation without having no transfer data between the source and target locations. Instead, the bit map 50, 60 and relationship table 54, 64 data structures maintain the point-in-time data at either source or target location.

Host Implementation of Point-in-Time Copy Operation

In preferred embodiments, the host 4 would submit a point-in-time copy command to the storage controller 8 including parameters that comprise input extents of tracks for a volume to include in the point-in-time copy operation. An extent comprises a beginning and ending track that defines a range of consecutive tracks. In preferred implementations, tracks from only one volume can be included in the relationship table 20 and the relationship table 20 may maintain up to, but not exceeding, 1024 extents. As discussed, each relationship table 20 would include a separate instance of the fields 24–36 for each extent, up to a total of 1024 extents.

An extent may comprise one or more tracks, only limited by the volume size. If there are 3339 cylinders in a volume and 15 tracks per cylinder in the DASD 6, then the number of possible extents for a volume that may be defined for a volume may far exceed the maximum number of extents, e.g., 1024, that may be maintained in the relationship table 20.

Figure 4A:
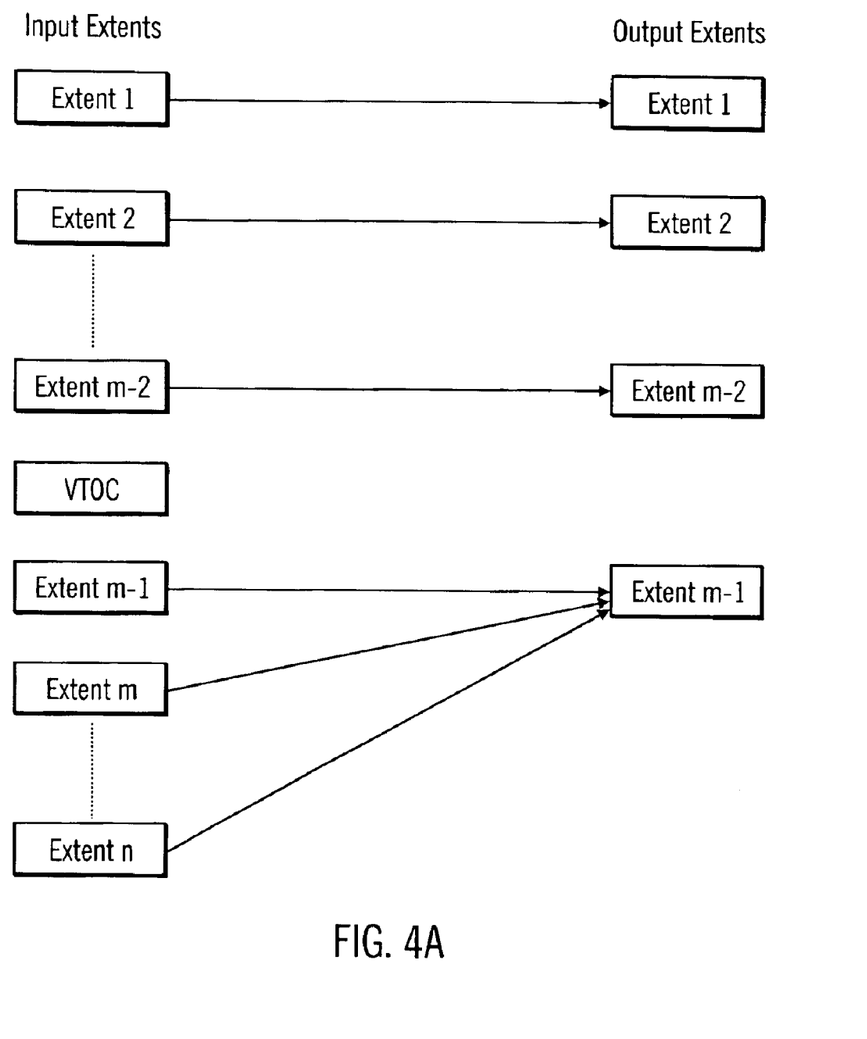
FIGS. 4a, b, and c illustrate how input extents subject to a point-in-time copy are mapped to output extents that are subjected to the point-in-time copy operation in accordance with preferred embodiments of the present invention.

Thus, if more than the threshold number of extents, e.g., 1024, were defined for a volume, then the host 4 could not create a point-in-time copy relationship for all or a substantial number of the extents in the volume. With preferred embodiments, the host 4 may specify any number of input extents, even a number exceeding the threshold limit, and the logic of FIGS. 5a, b would disperse the track ranges specified in the input extents into a fewer number of output extents that do not exceed the threshold number of extents. In preferred embodiments, a sequence of extents defines ranges of tracks that are in order, such that an earlier extent always has tracks before the tracks in later extents. However, consecutive extents may define non-consecutive ranges of tracks. FIGS. 4a, b, and c illustrate three different scenarios on the location of the VTOC with respect to the input extents. In the example of FIGS. 4a, b, c, m is the maximum number of extents that will be processed for a single volume in a single point-in-copy command. Thus, the relationship table for a volume cannot include more than m extents for a volume. Given this restriction, the host 4 cannot issue one or more point-in-time copy operations that would attempt to populate the relationship table for a volume with more than m extents. In current implementation, m equals 1024. Notwithstanding this extent limitation, in FIGS. 4a, b, c, the host 4 user may specify n input extents, where n is greater than m, of track ranges to include in the point-in-time copy operation.

In each of the FIGS. 4a, b, c, the host 4 has defined the n input extents to not include the VTOC. In this way, the host 4, provides that the extents include only user data, and not control data, so that any point-in-time copy or other operations on the input extents will only affect data and not control data, such as the VTOC. In the example in FIGS. 4a, b, c and in the logic of FIGS. 5a, b, two output extents are reserved to store the tracks from multiple extents in order to comply with the m threshold of extents for a volume that may be subjected to a point-in-time copy relationship. In this implementation, the first (m−2) input extents become the first (m−2) output extents in the parameter list, i.e., a one-to-one relationship between the first (m−2) input and output extents as shown in FIGS. 4a, b, and c. In the examples of FIGS. 4a, b, c, only two output extents, i.e., the (m−1)th and mth output extents, are reserved to store the tracks in any of the n input extents beyond the (m−1)th input extent. In other words, the tracks in the (m−1)th to nth input extents are distributed into the reserved output extents in the parameter list.

In FIG. 4a, the VTOC, or other control data, is located in tracks following the tracks in the (m−2)th input extent and before the tracks in the (m−1)th input extents. In such case, the preferred logic, discussed below, would place all the tracks in extents following the (m−2)th extent into one of the two output extents in the parameter list reserved to merge input extents. This avoids including tracks storing the VTOC in the output parameter list for the point-in-time copy command.

Figure 4B:
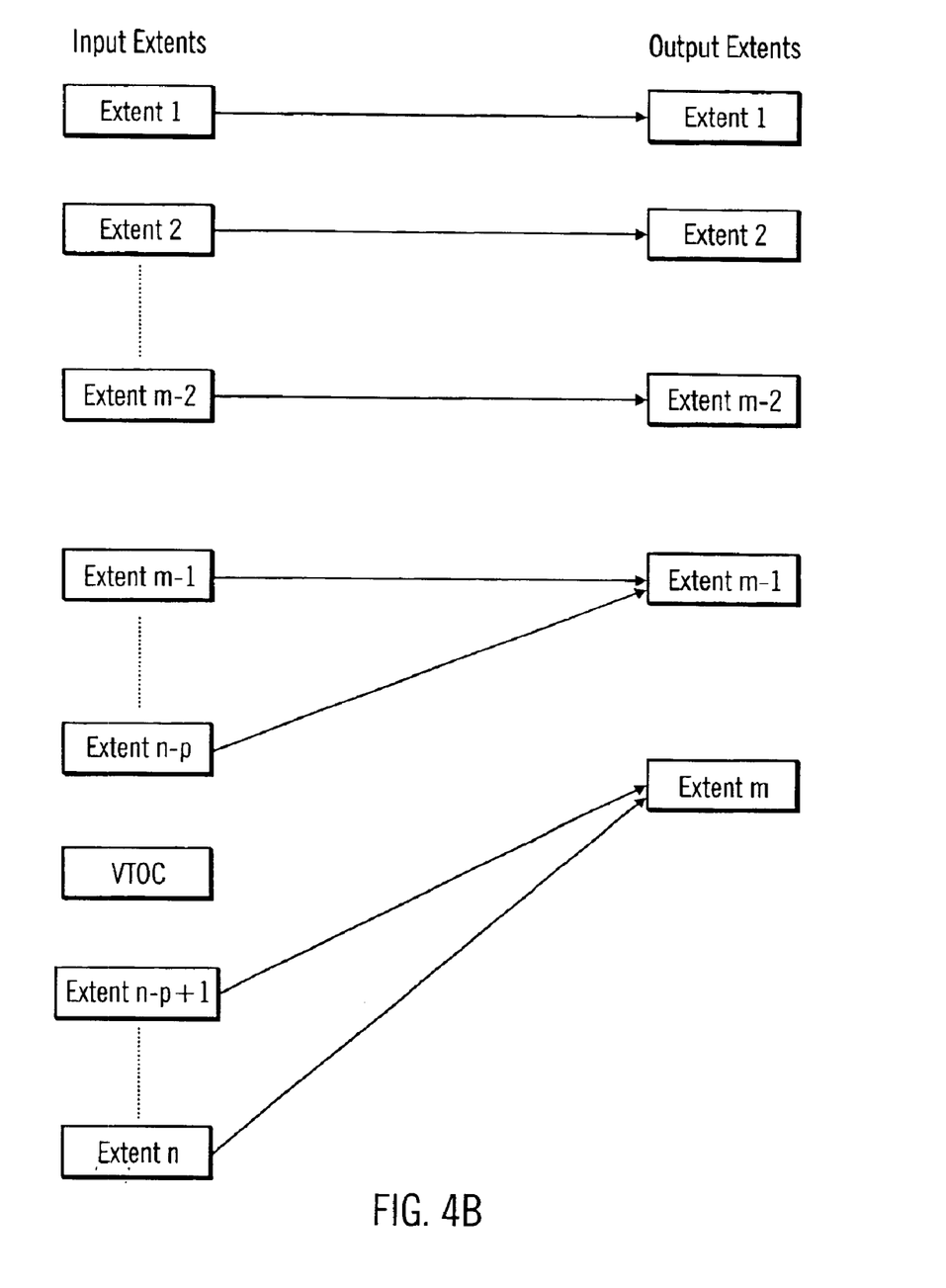

In the example of FIG. 4b, the tracks including the VTOC are located between the extents following the (m−2)th input extent. In the example, the VTOC is located in tracks between the (n−p)th extent, where p is an integer that is less than (n−m), and the next following extent, i.e., the (n−p+1)th extent. In such case, the logic of FIGS. 5a and b would use both reserved output extents. The first reserved output extent following the (m−2) output extent would have a beginning track equal to the beginning track of the (m−1)th input extent and an ending track equal to the ending rack of the (n−p)th extent, immediately preceding the VTOC tracks. The second reserved output extent, i.e., the mth output extent, would have a beginning track equal to the beginning track of the (n−p+1)th extent following the VTOC tracks and an ending track equal to the ending track of the nth input extent.

Figure 4C:
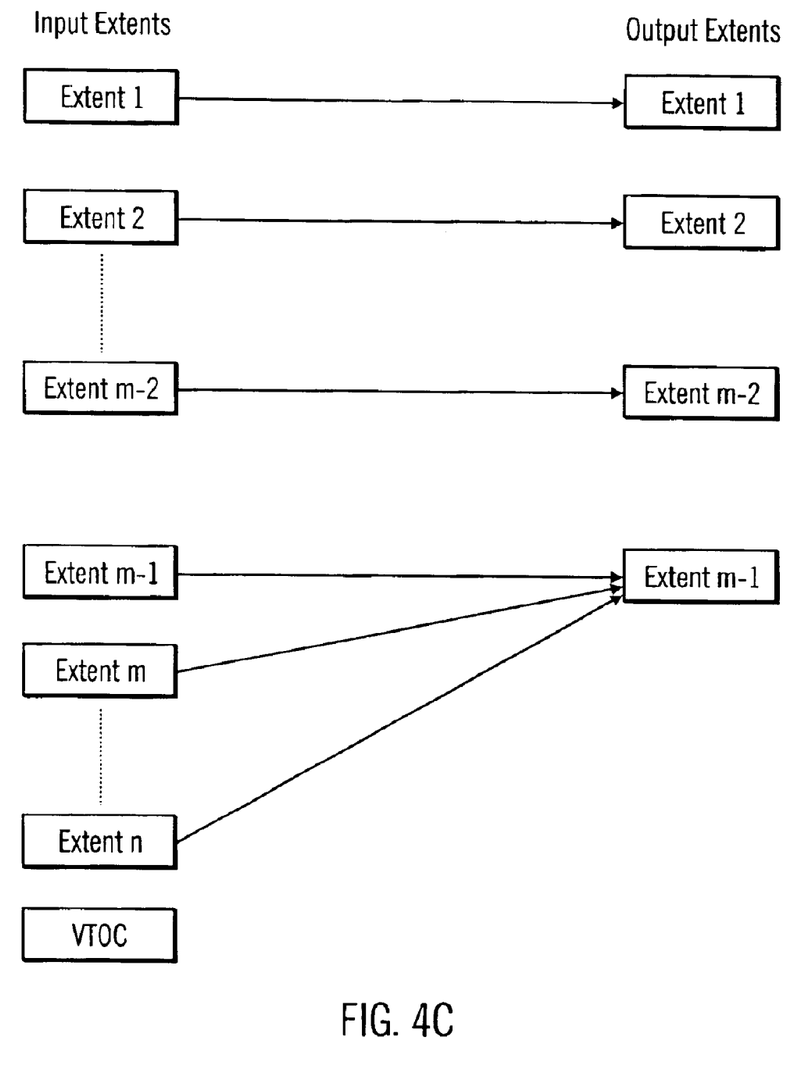

In the example of FIG. 4c, the VTOC follows the tracks in the nth input extent. In such case, the logic of FIGS. 5a and b would form one reserved output extent, i.e., the (m−1)th output extent, having a beginning track equal to the beginning track of the (m−1)th input extent and an ending track equal to the ending track of the nth input extent.

In the above examples, two output extents in the parameter list were reserved for storing input extents beyond the (m−2)th extent. However, alternative schemes could be used. For instance, more than two output extents in the parameter list may be used to store combined input extents. Moreover, alternative algorithms may be used to determine how to distribute n input extents among the m output extents, where m<n and m is the maximum number of extents that may be included in a relationship table for any one volume.

Figure 5A:
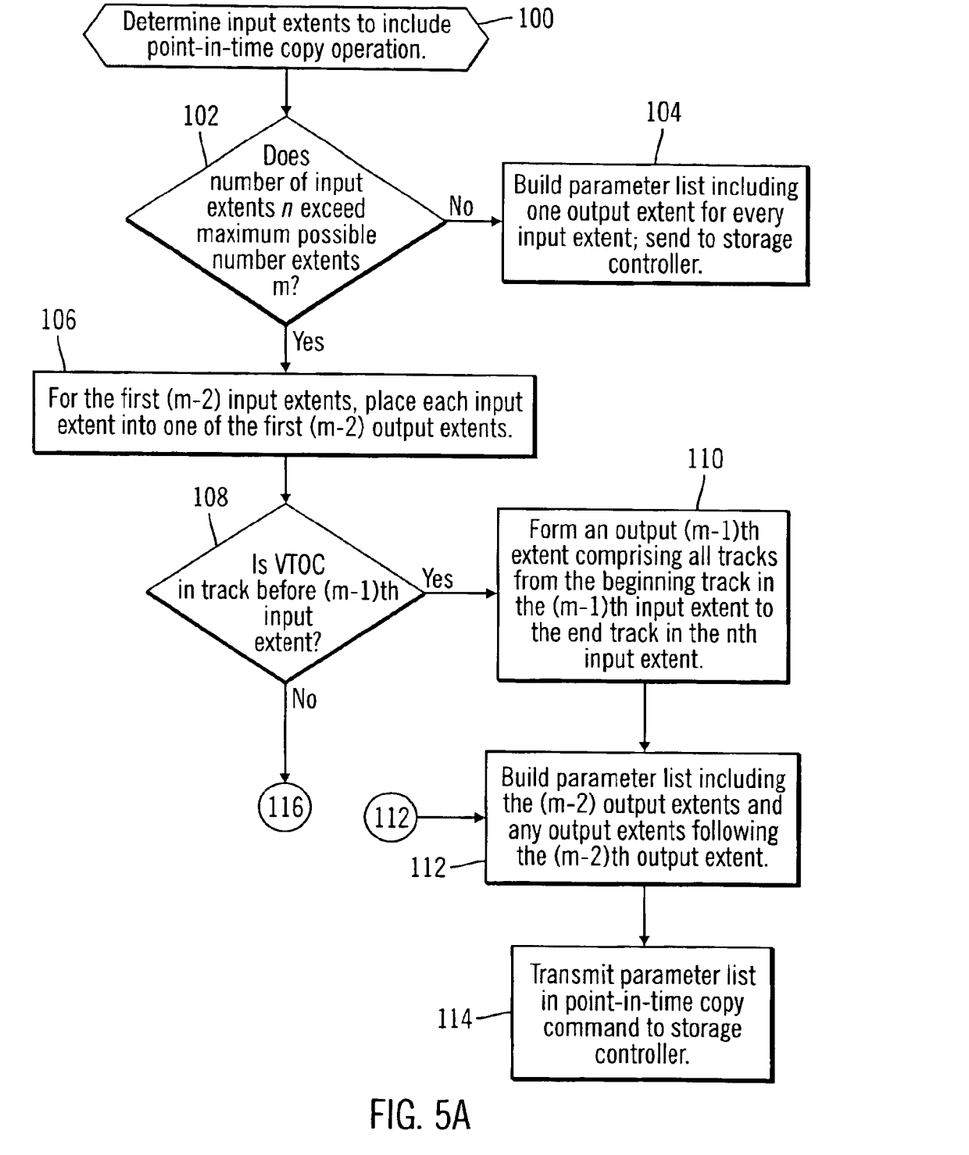
FIGS. 5a, b illustrate logic to map input extents to output extents when building the point-in-time copy operation in accordance with preferred embodiments of the present invention.
Figure 5B:
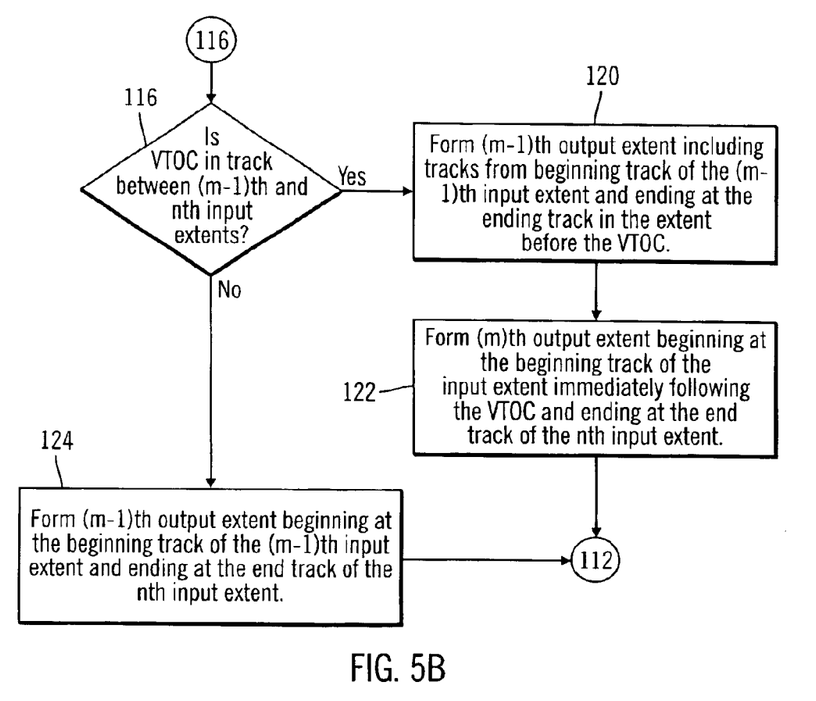

FIGS. 5a and 5b illustrate logic implemented in the host 4 to distribute tracks from n input extents into m output extents when building a point-in-time copy command that has as parameters extents in a single volume that are subject to a point-in-time copy operation. In preferred implementations, only m output extents for a volume may be included in a relationship table, i.e., a point-in-time copy relationship, at a time. For this reason, if the host 4 wants to include tracks from n extents in a volume in a point-in-time copy relationship, where n>m, then the logic of FIGS. 5a, b would modify the arrangement of tracks in the n extents to include all tracks specified in the n extents into m extents. With the preferred logic, when two extents, one subsequent to the other, are merged, the first track at the beginning of the first extent and the end track of the following extent are used to form a new extent. If the merged extents defined ranges of non-contiguous tracks, then the output extent formed by merging the two input extents would include all the tracks between the two input extents, as well as all the tracks within the two extents. Thus, the resulting output extent may include tracks that are not within any of the merged input extents. If an output extent formed by merging two input extents is subjected to a point-in-time copy operation, then the copy operation would include tracks not included in the merged input extents. In such case, tracks outside of the merged input tracks would be subject to the point-in-time copy operation as part of the merged output extent. However, the preferred logic will merge extents so as not include control data, such as the VTOC.

With respect to FIG. 5a, control begins at block 100 which represents the host 4 determining n input extents within one volume to include in a single point-in-time copy operation. The host 4 determines (at block 102) whether the number n of extents exceeds the threshold number m extents that may be subject to a point-in-time copy operation. The determination at block 102 may also include determining the number of current extents in a relationship table for the volume to insure that the number of extents n plus the current number of extents already in the relationship table for the volume do not exceed the threshold m. If the threshold m is not exceeded, then the host 4 builds (at block 104) a point-in-time copy command including n output parameters, one for each of the n input extents to include in the operation. The host 4 then transmits the command to the storage controller 8 to add the output extents to a relationship table for the volume. The tracks in the m output extents in the command parameter would provide the source tracks of a point-in-time copy operation. The host 4 would have to specify in other parameters of the command target tracks of the copy operation.

If the number of input extents n exceeds the threshold m for the command, then the host 4 organizes (at block 106) the first (m−k) input extents into the first (m−k) output extents in the parameter list, where k is a constant indicating the number of output extents that will be reserved to store merged input extents. In the examples in FIGS. 4a, b, c and the discussion with respect to FIGS. 5a, b, k=2. The k output extents in the parameter list may be used for storing tracks from multiple input extents following the (m−k)th input extent. The host 4 then proceeds to determine the location of the VTOC with respect to the input extents following the (m−2)th input extent. The host 4 determines (at block 108) whether the VTOC is in track(s) before the beginning track of the (m−1)th input extent. The example in FIG. 4a illustrates a situation where the VTOC is between the (m−2)th and (m−1)th extent. If so, then the host 4 will form (at block 110) an output (m−1)th extent for the parameter list comprising all tracks from the beginning track in the (m−1)th input extent to the end track in the nth input extent. In this way, the tracks in all the extents following the (m−2) input extent will be merged into a single output extent, along with any tracks between the merged input extents. The host 4 will then build (at block 112) a parameter list including the (m−2) output extents and any output extents formed by merging the tracks from multiple input extents in output extents following the (m−2)th output extent. The host 4 then transmits the point-in-time copy command including the built parameter list to the storage controller 8 for execution.

If the VTOC is not before the (m−1)th input extent, then the host 4 determines (at block 116) whether the VTOC is between the (m−1)th and nth input extents. If so, the host 4 forms (at block 120) an (m−1)th output extent comprising all tracks from the beginning track of the (m−1)th input track to the end track in the extent immediately before the beginning track of the VTOC. FIG. 4b shows this situation where the VTOC follows the (n−p)th input extent, where p is an integer less than n minus m. In such case, the (m−1)th extent includes all tracks from the beginning of the (m−1)th input track to the end track of the (n−p)th input extent. The host 4 then forms (at block 122) the mth output extent beginning at the beginning track of the input extent track immediately following the VTOC and ending at the end track of the nth input extent, i.e., from the (n−p+1) to n input extents. Control then proceeds to block 112 to build and submit a parameter list with the m output extents.

Otherwise, if the VTOC is in tracks following the tracks comprising the nth input extent, then the host 4 forms (at block 124) an (m−1)th output extent including all the tracks from the beginning track of the (m−1)th input extent to the end track of the nth input extent. The host 4 would proceed back to block 112 to build and submit the parameter list of the m output extents.

Preferred embodiments provide logic for altering an arrangement of tracks in input extents by taking a number of extents, which each form a range of tracks, and producing fewer output extents by combining tracks from multiple input extents. Preferred embodiments are useful when a user specifies ranges or extents of tracks to include in a command that is greater than the number of extents the command will operate upon at any given time. Moreover, if there is control data that should not be included in the output extents, the preferred logic will form extents including tracks from multiple input extents and at the same time avoid including the control data within tracks specified in the output extents.

Conclusion and Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to arranging the tracks in extents to include in parameters in a point-in-time copy operation. However, the logic for rearranging tracks may apply to any type of command or operation involving ranges of tracks and is not just limited to point-in-time copy operations on ranges of tracks.

Preferred embodiments described the logic for determining how to include the extents as parameters for the command as being implemented in the host 4. However, in alternative embodiments, the storage controller 8 may determine whether the arrangement of tracks in extents in the parameters of a received point-in-time copy command needs to be rearranged to comply with the extent limitation for the relationship table for a volume.

Preferred embodiments were described with respect to separate bit map and relationship table data structures for source and target locations involved in logical erase and point-in-time copy operations. However, in alternative embodiments the information maintained in the described bit map and relationship table data structures may be maintained in a different data structure format than that described herein.

Preferred embodiments may be implemented in update-in place systems in which updates are written to the previous location of the updated data. In case of an update, the point-in-time data is copied to the target location to allow the update to proceed at the source location. Alternatively, the preferred embodiments may apply to a virtual storage location, such as an LSA virtual array, where a table maps logical storage locations to actual physical locations. In such case the source and target locations comprise virtual arrays or pointers to physical locations. An update to the logically erased data would involve an update to a new location and modifying the source virtual array pointers to address the updated copy at the new location.

In summary, preferred embodiments disclose a method, system, and program for building a list of parameters to include with a command. A plurality of input parameters is received and a determination is made as to whether a number of the input parameters exceeds a threshold number of parameters that are capable of being included in the command. The content of multiple input parameters is merged into at least one output parameter if the number of input parameters exceeds the threshold number, such that the content of the input parameters is included in a number of output parameters that does not exceed the threshold. The output parameters are then included with the command.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for building a list of parameters to include with a command, comprising:
   receiving a plurality of input parameters, wherein each input parameter comprises at least one extent, and wherein one extent defines a range of tracks between a beginning track and an end track;
   determining whether a number of the input parameters exceeds a threshold number of parameters that are capable of being included in the command;
   merging content of multiple input parameters into at least one output parameter if the number of input parameters exceeds the threshold number, wherein the content of the input parameters is included in a number of output parameters that does not exceed the threshold; and
   including the output parameters with the command.

2. The method of claim 1, wherein the beginning track of a given extent follows the tracks in all previous extents, and wherein each output parameter includes at least one input extent and wherein at least one output parameter includes the tracks from multiple input extents if the number of input extents exceeds the threshold number.

3. The method of claim 2, wherein merging multiple input tracks into one output extent further comprises defining the output extent as having a beginning track equal to the beginning track of a first of the multiple input tracks to merge and an ending track equal to the ending track of the a last of the multiple input tracks to merge.

4. The method of claim 2, further comprising:
   determining whether control data is stored in tracks between the tracks of the input extents; and
   arranging the tracks in the input extents into the output extents in a manner that avoids including any control data tracks in the tracks defined in the output extents.

5. The method of claim 2, wherein the command is a copy command to copy the track ranges defined in the output extents included as parameters to target tracks, wherein the target tracks are capable of storing a duplicate copy of the data in the track ranges defined in the output extents.

6. The method of claim 5, wherein the copy command is a point-in-time copy command that indicates in data structures that the tracks in the output extents included as parameters are subject to a point-in-time copy relationship.

7. The method of claim 6, wherein the data in the tracks in one output extent subject to the point-in-time copy relationship are only copied to the target tracks if the data in one track in the output extents is modified.

8. A method for building a list of parameters to include with a command, comprising:
   receiving a plurality of input parameters for the command, wherein each input parameter comprises at least one extent that defines a range of tracks between a beginning track and end track and wherein the beginning track of a given extent follows the tracks in all previous extents;
   determining whether a number of the input parameters exceeds a threshold number of parameters that are capable of being included in the command;
   merging content of multiple input parameters into at least one output parameter if the number of input parameters exceeds the threshold number, wherein the content of the input parameters is included in a number of output parameters that does not exceed the threshold, wherein each output parameter includes at least one input extent and wherein at least one output parameter includes the tracks from multiple input extents if the number of input extents exceeds the threshold number, and wherein there are n input extents, the threshold number of extents is m, and n is greater than m, further comprising:
   (a) placing each of a plurality of (m−k) input extents into (m−k) separate output extents, wherein k is an integer less than n minus m; and
   (b) arranging the remaining (m−k+1) to n input extents into at least one of k output extents; and
   including the output parameters with the command.

9. The method of claim 8, further comprising determining whether control data is stored in tracks before the (m−k+1) input extent, wherein arranging the remaining (m−k+1) to n input extents into at least one of k output extents comprises arranging the remaining input extents into one output extent if the control data is stored in tracks before the (m−k+1) input extent.

10. The method of claim 8, further comprising:
    determining whether control data is stored in tracks between the (m−k+1) and n input extents;
    arranging the extents from the (m−k+1) input extent to the input extent immediately preceding the track storing the control data into a first output extent if the control data is stored in tracks between the (m−k+1) and n input extents; and
    arranging the extents from the input extent following the control data to the n input extent into a second output extent if the control data is stored in tracks between the (m−k+1) and n input extents.

11. A system for building a list of parameters to include with a command, comprising:
    a processor;
    means for receiving a plurality of input parameters, wherein each input parameter comprises at least one extent, and wherein one extent defines a range of tracks between a beginning track and an end track;
    means for determining whether a number of the input parameters exceeds a threshold number of parameters that are capable of being included in the command;
    means for merging content of multiple input parameters into at least one output parameter if the number of input parameters exceeds the threshold number, wherein the content of the input parameters is included in a number of output parameters that does not exceed the threshold; and
    means for including the output parameters with the command.

12. The system of claim 11, further comprising a storage device wherein each input parameter comprises at least one extent that defines a range of tracks in the storage device between a beginning track and end track on the storage device, wherein the beginning track of a given extent follows the tracks in all previous extents, and wherein each output parameter includes at least one input extent and wherein at least one output parameter includes the tracks from multiple input extents if the number of input extents exceeds the threshold number.

13. The system of claim 12, wherein the processor comprises a first processor, further comprising:

a second processor in communication with the first processor and having access to the storage device;

means, implemented in the first processor to communicate the command including the output extent to the second processor; and means, implemented in the second processor, for performing an operation defined by the command with respect to the output extents.

14. The system of claim 12, wherein merging multiple input tracks into one output extent further comprises means for defining the output extent as having a beginning track equal to the beginning track of a first of the multiple input tracks to merge and an ending track equal to the ending track of the a last of the multiple input tracks to merge.

15. The system of claim 12, further comprising:

means for determining whether control data is stored in tracks between the tracks of the input extents; and means for arranging the tracks in the input extents into the output extents in a manner that avoids including any control data tracks in the tracks defined in the output extents.

16. The system of claim 12, wherein the command is a copy command to copy the track ranges defined in the output extents included as parameters to target tracks, wherein the target tracks are capable of storing a duplicate copy of the data in the track ranges defined in the output extents.

17. The system of claim 16, wherein the copy command is a point-in-time copy command that indicates in data structures that the tracks in the output extents included as parameters are subject to a point-in-time copy relationship.

18. The system, of claim 17, wherein the data in the tracks in one output extent subject to the point-in-time copy relationship are only copied to the target tracks if the data in one track in the output extents is modified.

19. The system of claim 18, wherein the processor comprises a first processor, further comprising:

a second processor in communication with the first processor and having access to the storage device;

means, implemented in the first processor to communicate the command including the output extent to the second processor; and means, implemented in the second processor, for performing the point-in-time copy operation.

20. A system for building a list of parameters to include with a command, comprising:

a processor;

a storage device;

means for receiving a plurality of input parameters, wherein each input parameter comprises at least one extent that defines a range of tracks in the storage device between a beginning track and end track on the storage device and wherein the beginning track of a given extent follows the tracks in all previous extents;

means for determining whether a number of the input parameters exceeds a threshold number of parameters that are capable of being included in the command;

means for merging content of multiple input parameters into at least one output parameter if the number of input parameters exceeds the threshold number, wherein the content of the input parameters is included in a number of output parameters that does not exceed the threshold and wherein each output parameter includes at least one input extent and wherein at least one output parameter includes the tracks from multiple input extents if the number of input extents exceeds the threshold number, and wherein there are n input extents, the threshold number of extents is m, and n is greater than m, further comprising:

(a) means for placing each of a plurality of (m−k) input extents into (m−k) separate output extents, wherein k is an integer less than n minus m; and (b) means for arranging the remaining (m−k+1) to n input extents into at least one of k output extents; and means for including the output parameters with the command.

21. The system of claim 20, further comprising means for determining whether control data is stored in tracks before the (m−k+1) input extent, wherein arranging the remaining (m−k+1) to n input extents into at least one of k output extents comprises arranging the remaining input extents into one output extent if the control data is stored in tracks before the (m−k+1) input extent.

22. The system of claim 20, further comprising:

means for determining whether control data is stored in tracks between the (m−k+1) and n input extents;

means for arranging the extents from the (m−k+1) input extent to the input extent immediately preceding the track storing the control data into a first output extent if the control data is stored in tracks between the (m−k+1) and n input extents; and means for arranging the extents from the input extent following the control data to the n input extent into a second output extent if the control data is stored in tracks between the (m−k+1) and n input extents.

23. An article of manufacture for use in building a list of parameters to include with a command, the article of manufacture comprising computer useable media accessible to a computer, wherein the computer usable media includes at least one computer program that is capable of causing the computer to perform:

receiving a plurality of input parameters, wherein each input parameter comprises at least one extent, and wherein one extent defines a range of tracks between a beginning track and an end track;

determining whether a number of the input parameters exceeds a threshold number of parameters that are capable of being included in the command;

merging content of multiple input parameters into at least one output parameter if the number of input parameters exceeds the threshold number, wherein the content of the input parameters is included in a number of output parameters that does not exceed the threshold; and including the output parameters with the command.

24. The article of manufacture of claim 23, wherein the beginning track of a given extent follows the tracks in all previous extents, and wherein each output parameter includes at least one input extent and wherein at least one output parameter includes the tracks from multiple input extents if the number of input extents exceeds the threshold number.

25. The article of manufacture of claim 24, wherein merging multiple input tracks into one output extent further comprises defining the output extent as having a beginning track equal to the beginning track of a first of the multiple input tracks to merge and an ending track equal to the ending track of the a last of the multiple input tracks to merge.

26. The article of manufacture of claim 24, further comprising:

determining whether control data is stored in tracks between the tracks of the input extents; and arranging the tracks in the input extents into the output extents in a manner that avoids including any control data tracks in the tracks defined in the output extents.

27. The article of manufacture of claim 24, wherein the command is a copy command to copy the track ranges defined in the output extents included as parameters to target tracks, wherein the target tracks are capable of storing a duplicate copy of the data in the track ranges defined in the output extents.

28. The article of manufacture of claim 27, wherein the copy command is a point-in-time copy command that indicates in data structures that the tracks in the output extents included as parameters are subject to a point-in-time copy relationship.

29. The article of manufacture of claim 28, wherein the data in the tracks in one output extent subject to the point-in-time copy relationship are only copied to the target tracks if the data in one track in the output extents is modified.

30. An article of manufacture for use in building a list of parameters to include with a command, the article of manufacture comprising computer useable media accessible to a computer, wherein the computer usable media includes at least one computer program that is capable of causing the computer to perform:

receiving a plurality of input parameters, wherein each input parameter comprises at least one extent that defines a range of tracks between a beginning track and end track and wherein the beginning track of a given extent follows the tracks in all previous extents;

determining whether a number of the input parameters exceeds a threshold number of parameters that are capable of being included in the command;

merging content of multiple input parameters into at least one output parameter if the number of input parameters exceeds the threshold number, wherein the content of the input parameters is included in a number of output parameters that does not exceed the threshold, wherein each output parameter includes at least one input extent and wherein at least one output parameter includes the tracks from multiple input extents if the number of input extents exceeds the threshold number and wherein there are n input extents, the threshold number of extents is m, and n is greater than m, further comprising:

(a) placing each of a plurality of (m−k) input extents into (m−k) separate output extents, wherein k is an integer less than n minus m; and (b) arranging the remaining (m−k+1) to n input extents into at least one of k output extents; and including the output parameters with the command.

31. The article of manufacture of claim 30, further comprising determining whether control data is stored in tracks before the (m−k+1) input extent, wherein arranging the remaining (m−k+1) to n input extents into at least one of k output extents comprises arranging the remaining input extents into one output extent if the control data is stored in tracks before the (m−k+1) input extent.

32. The article of manufacture of claim 30, further comprising:

determining whether control data is stored in tracks between the (m−k+1) and n input extents;

arranging the extents from the (m−k+1) input extent to the input extent immediately preceding the track storing the control data into a first output extent if the control data is stored in tracks between the (m−k+1) and n input extents; and arranging the extents from the input extent following the control data to the n input extent into a second output extent if the control data is stored in tracks between the (m−k+1) and n input extents.

* * * * *